Oct. 18, 1949.   S. SCHMIDT   2,484,858
MARSHALLOW ROASTER
Filed Nov. 15, 1946
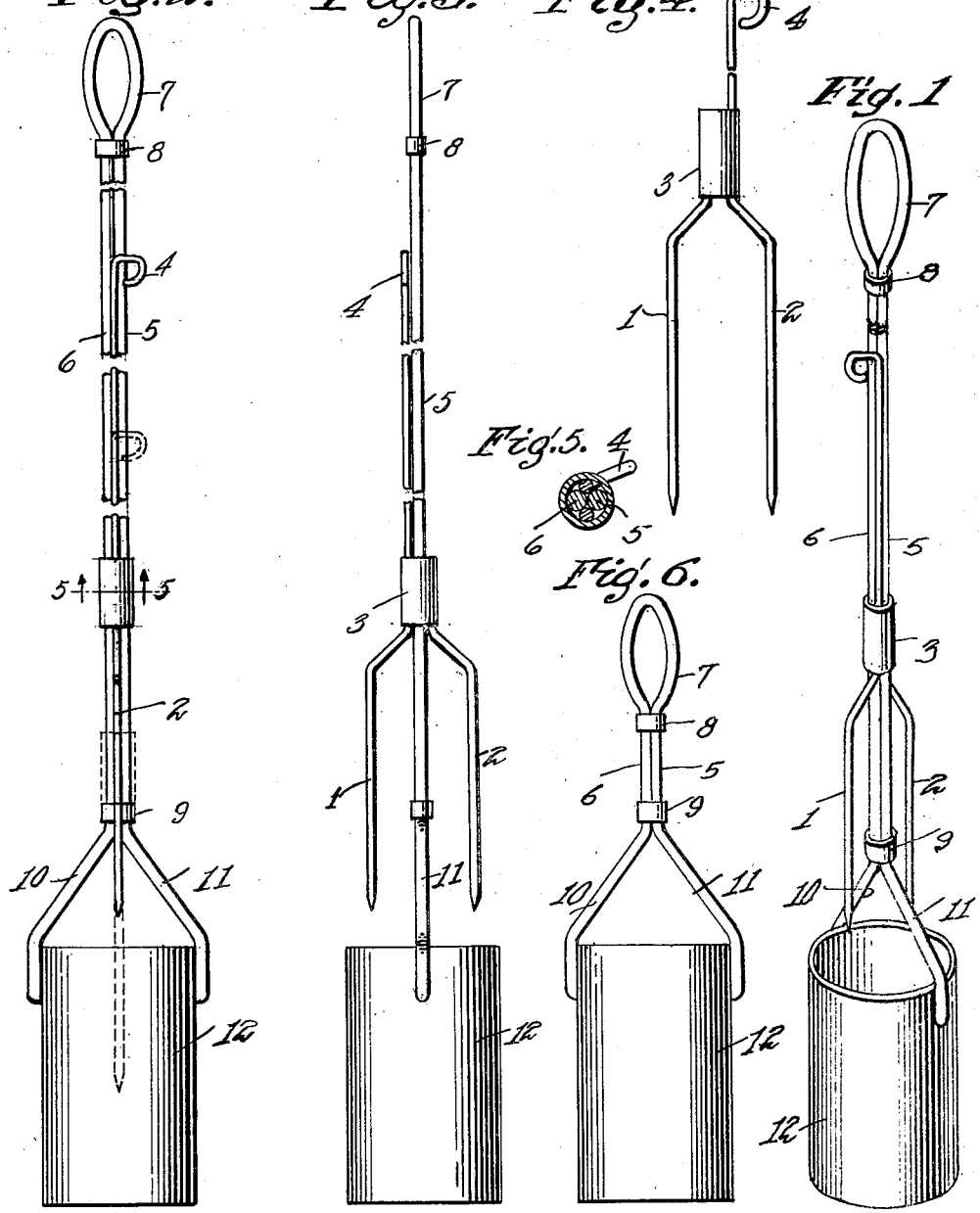
INVENTOR.
Sylvester Schmidt
BY Victor J. Evans & Co.
ATTORNEYS Patented Oct. 18, 1949

2,484,858

UNITED STATES PATENT OFFICE 2,484,858

MARSHMALLOW ROASTER

Sylvester Schmidt, Mukilteo, Wash.

Application November 15, 1946, Serial No. 710,079

4 Claims. (Cl. 99—421)

This invention relates to improvements in devices for roasting marshmallows, wieners, corn on the cobb, apples and the like in outside campfires or inside fireplaces.

It is an object of the invention to provide a roasting device which is easy to handle and protects the article being roasted from black smoke and the like.

A further object is to provide a roasting device which can be advantageously used by tourists and campers, eliminating the cutting of green tree limbs and shrubbery to provide sticks for roasting purposes.

A further object is the provision of a roasting device which can be conveniently manipulated without danger of burning the hands.

These and other objects are attained by the novel construction and arrangement of parts hereinafter described and illustrated by the accompanying drawings, forming a part hereof, and in which:

Fig. 1 is a perspective view of a roasting device embodying the invention.

Fig. 2 is a side view of the device in position for roasting.

Fig. 3 is a view of the device with parts in position for attaching the articles to be roasted.

Fig. 4 is a view of a fork member used for holding the articles being roasted.

Fig. 5 is a sectional view on the line 5—5 of Fig. 2.

Fig. 6 is a view of an oven used in the device.

Referring to the drawings, the device for roasting is shown to comprise (see Fig. 4) a forked member having legs 1 and 2 which are welded or otherwise secured to a sleeve 3, the leg 2 extending an appreciable distance above the sleeve and having its upper end curved to form a handle 4.

Passing through the sleeve 3 and slidable relative thereto are a pair of rods 5 and 6, the upper ends of which are integral and form a handle 7. The rods are held together by clamps 8 and 9, and the lower ends of the rods 5 and 6 are bent outwardly as shown at 10 and 11, which portions are welded to an oven 12, the latter being of round or square tubing.

In operation, the marshmallows are placed on the prongs or legs 1 and 2 and slid up to the bend about three fourths of an inch more or less so that they will not stick together when roasting. When both sides of the prongs are full, the handle 4 is pushed forward to place the marshmallows in the oven as far as they will go. When the marshmallows are browned, the assembly is pulled out of the fire by holding one hand on handle 7, and with the other hand the forked member is pulled out of the oven by means of handle 4. The marshmallows are then removed, and the forked member can then be reloaded with marshmallows or whatever article it is desired to roast.

The device is simple to operate and conveniently carried by tourists or campers. It is durable and inexpensive with no parts to get out of order.

The above description is to be considered as illustrative and not limitative of the invention of which modifications can be made without departing from the spirit and scope as denoted by the appended claims.

The invention having been described, what is claimed is:

1. In a device for roasting marshmallows or the like, a pair of rods integral at one end to form a handle, clamps for holding the rods together, an oven, the lower ends of the rods being secured to the oven, a sleeve slidably positioned on the rods, a pair of prongs for holding marshmallows secured to the sleeve, and a handle on one of said prongs for moving the prongs and marshmallows into the oven preparatory to placing the oven in a fire for the roasting of the marshmallows.

2. In a device for roasting articles, a pair of rods, a handle formed on said rods, an oven secured to one end of the rods, a sleeve slidably mounted on the rods, and a pair of prongs secured to the sleeve, said prongs being in alinement with said oven and of a size to fit into said oven one of the prongs extending above the sleeve and having a handle formed thereon which is adapted to move said prongs into and out of said oven.

3. In a device for roasting articles, a pair of rods, an oven secured to the rods, a sleeve slidably positioned on the rods, and a pair of prongs of a size to fit into said oven secured to the sleeve, one of the prongs extending above the sleeve and having a handle thereon which is adapted to move said prongs into and out of said oven.

4. In a device for roasting acticles, a pair of rods, a handle at one end of the rods, an oven attached to the other end of the rods, means for clamping the rods together, a sleeve slidable on the rods, a pair of prongs of a size to enter said oven secured to the sleeve, and means on one of the prongs for moving the sleeve on the rods to move the prongs into and out of said oven.

SYLVESTER SCHMIDT.

No references cited.